US011858189B2

(12) United States Patent
Sutter

(10) Patent No.: US 11,858,189 B2
(45) Date of Patent: Jan. 2, 2024

(54) TRANSFER SYSTEM HAVING AN INJECTION DEVICE INTEGRATED IN A FEED TABLE

(71) Applicant: STEFAN PFAFF WERKZEUG- UND FORMENBAU GMBH & CO KG, Röthenbach (DE)

(72) Inventor: Anton Sutter, Weiler-Simmerberg (DE)

(73) Assignee: STEFAN PFAFF WERKZEUG- UND FORMENBAU GMBH & CO KG, Röthenbach (DE)

( * ) Notice: Subject to any disclaimer, the term of this patent is extended or adjusted under 35 U.S.C. 154(b) by 513 days.

(21) Appl. No.: 17/166,320

(22) Filed: Feb. 3, 2021

(65) Prior Publication Data
US 2021/0268704 A1 Sep. 2, 2021

(30) Foreign Application Priority Data

Feb. 28, 2020 (EP) .................................... 20160078

(51) Int. Cl.
B29C 45/14 (2006.01)
B29C 45/67 (2006.01)
(Continued)

(52) U.S. Cl.
CPC ...... B29C 45/6714 (2013.01); B29C 45/0055 (2013.01); B29C 45/0441 (2013.01);
(Continued)

(58) Field of Classification Search
CPC ............ B29C 45/6714; B29C 45/0055; B29C 45/0441; B29C 2045/0058; B29C 2793/009; B29C 45/14008; B29C 45/64; B29C 2045/14139; B29C 2045/664; B29C 45/14016; B29C 45/14065;
(Continued)

(56) References Cited

U.S. PATENT DOCUMENTS 3,249,966 A 5/1966 Ludwig

FOREIGN PATENT DOCUMENTS

DE 1 201 040 B 9/1965
EP 3 605 759 A1 2/2020
(Continued)

OTHER PUBLICATIONS

Extended European Search Report (Application No. 20160078.0) dated Aug. 5, 2020.

Primary Examiner — Armand Melendez
(74) Attorney, Agent, or Firm — BURR PATENT LAW, PLLC

(57) ABSTRACT

A transfer system which can be used in a flexible manner for transporting or processing, respectively, profiles, in which the injection device comprises a mold for receiving the profile during the injection, wherein the mold has at least two contour parts and the injection device has a closing unit for opening/closing the contour parts, wherein the closing unit is configured for keeping the contour parts open until the profile is enclosed by the contour parts, and wherein the transportation device is configured for moving, preferably not rotating, the profile exclusively parallel to the transportation path, wherein the closing unit and the injection device are assembled so as to be displaceable conjointly with the first feed table, and the first feed table in the direction of the transportation path is displaceable so far until the contour parts enclose the profile.

15 Claims, 5 Drawing Sheets

(51) Int. Cl.
   *B29C 45/00*    (2006.01)
   *B29C 45/04*    (2006.01)
   *B29L 31/26*    (2006.01)

(52) U.S. Cl.
   CPC .................. *B29C 45/14065* (2013.01); *B29C 2045/0058* (2013.01); *B29C 2793/009* (2013.01); *B29L 2031/26* (2013.01)

(58) Field of Classification Search
   CPC ........ B29C 45/14409; B29C 45/14549; B29C 45/0003; B29L 2031/26; B29L 2031/003; B29L 2031/3005
   See application file for complete search history.

(56)   References Cited

FOREIGN PATENT DOCUMENTS

| | | | |
   |---|---|---|---|
   | JP | 2015-157410 | A1 | 9/2015 |
   | JP | 2017-087702 | A1 | 5/2017 |
   | WO | 2009/143583 | A1 | 12/2009 |

TRANSFER SYSTEM HAVING AN INJECTION DEVICE INTEGRATED IN A FEED TABLE

FIELD OF THE INVENTION

The present invention relates to a transfer system for transporting and processing profiles, in particular door seal profiles for motor vehicles.

BACKGROUND OF THE INVENTION

Numerous transfer systems in which sealing profiles for motor vehicles are moved over a conveyor line and thus make their way from one processing station to the next are known from the prior art. Feed tables which typically support cutting tools and including the tool can be moved to the profile and cut the profile are also used in transfer systems of this type. In principle, separate processing stations are also provided in transfer systems of this type according to the prior art, wherein the profile is supplied to these stations in that the profile is even retrieved from the actual conveyor line.

SUMMARY OF THE INVENTION

It is an object of the present invention to be able to provide a transfer system which in comparison to the transfer systems to date known from the prior art can offer significant cost advantages in association with a higher level of flexibility.

The transfer system according to the present invention serves for processing profiles and can above all be used for producing door seal profiles for motor vehicles. During processing, the profiles are transported over a specific transportation path and thus make their way from one processing station to the next. Such a processing station can in principle be present in the form of feed tables that are equipped with tools, for example.

A transportation device for transporting the profile on the transportation path is provided in the case of the present invention. The transfer system moreover possesses at least one first feed table which is displaceable relative to the transportation path, or to the profile to be displaced on the transportation path, respectively. It is typically convenient for the displacement path of the feed table to run perpendicularly to the transportation path. Typical processing in the individual processing stations includes, for example, the trimming of the profiles by means of cutting tools or the bending by means of corresponding bending devices.

Provided according to the present invention is moreover at least one injection device for producing an injection-molded end, for injection-molding a further profile portion, a positioning pin, or for connecting the profile to a further profile portion. During the injection, a further, injection-molded plastics material is added to the corresponding profile. This herein can be a finishing feature at the end of the profile, or an end cap, respectively; however, an entire further profile portion may also be injected. It is also conceivable for the profile to be placed on a further, already existing profile portion, and for both to be connected to one another by injection-molding. Moreover, so-called positioning pins which serve for marking a specific location on the profile such that the processing pins can be used for aligning the profile in a processing station, for example, may also be injected. Positioning pins can moreover also be utilized during assembling so as to be able to more easily align and assemble the profile in relation to a door or a portion of the body.

The transportation device places the profile on the transportation path in a processing position in which the profile is processed, presently, in particular, also when processed by an injection device as is provided by the present invention.

The transfer system according to the present invention is now distinguished in that at least part of the injection device is assembled on the feed table and is displaced conjointly with the latter. The injection device first comprises a mold for receiving and mounting the profile during the injection and for configuring the cavity to be filled during the injection. The cavity is a space into which the liquid plastics material can make its way during the injection, wherein the injection forms the end portion or the new profile portion, for example. The mold is composed of at least two contour parts for enclosing the profile in the part to be injection-molded during the injection-molding and for configuring the cavity on the profile. The injection device furthermore comprises a closing unit for opening and closing the contour parts, wherein the closing unit when moving the first feed table relative to the profile in turn is configured for keeping the contour parts open until the feed table has reached the terminal position thereof relative to the processing position of the profile such that the profile portion to be processed can actually be enclosed by the contour parts. This means that the transportation device moves the profile over the transportation path and stops the latter as soon as the profile is situated in a corresponding processing position, for example, for an injection procedure.

According to the present invention, the injection device is, however, not configured so as to be stationary, i.e. as a separate processing cell, but is situated on a feed table which then moves relative to the profile which is situated in the processing position. The contour parts of the mold, or of the injection device, respectively, in this region are in a position in which the two parts do not collide with the profile. In one embodiment, the profile parts can be pivoted, for example. The profile is received only when the mold is closed on account of the movement of the contour parts, so that the cavity to be filled can be formed. This closing procedure is completed only when the actual injection procedure can commence, i.e. once the injection device conjointly with the feed table has already been sufficiently displaced in the direction toward the transportation path such that the profile can be held by closing the mold. However, the transportation device does not have to do also rotate the profile, for example, but according to the present invention can merely displace the profile parallel to the transportation path.

Moreover provided is a closing unit by way of which the contour parts can be opened and closed, wherein the closing unit when moving the first feed table relative to the profile keeps the contour parts open so long until the profile can be received by the contour parts, that is to say that the first feed table has correspondingly been displaced sufficiently far in the direction of the transportation path or of the profile, respectively, and the contour parts can receive the profile in the processing position. The closing unit thereafter closes and the contour parts externally surround the profile to be processed.

From the prior art it is known for the profiles to be moved and introduced into the injection device by handling; according to the prior art, the profiles are therefore inter alia automatically or manually received by the handling and placed into corresponding injection devices (injection-molding cells). According to the prior art, entire injection machines are alternatively moved onto the profiles, wherein handling (rotating) of the profiles is also required to this end. Conventional processing stations of this type from the prior art first require substantially more space. Optionally, an additional handling device per station also has to be available, the handling device correspondingly retrieving the profiles and positioning the latter in the injection device, and retrieving the profile again from the latter, respectively. If the profiles are introduced into an injection device in a mechanized manner, the profiles according to the prior art generally also have to be rotated; the latter is not necessary in the case of the present invention because a closing unit which can displace the contour parts and also be moved transversely to the transportation path of the profile, both when opening as well as when closing, without the profile on account thereof having to be moved but being able to remain in its processing position, is provided.

The injection device can thus be accommodated in a space-saving manner on a feed table. In the corresponding system, this also ensures a substantially higher degree of flexibility because the corresponding feed tables are configured in a compact manner and can also be readily re-equipped, while conventional injection devices according to the prior art require a lot of space and are cost-intensive. When retrofitting an injection device, a complete conversion of the transfer system typically had to take place according to the prior art because the transportation path had to be interrupted at the location where the injection station was to be incorporated and feed tables had to be rearranged, for example.

A transfer system according to the present invention during the entire lifespan thereof can thus be utilized and used in a substantially more flexible manner because feed tables can be removed or replaced without too much complexity, while such workstations which in principle represent an interruption of the transportation on the transportation path can be avoided. Fixedly installed injection stations and the associated handling systems by way of which the profile has to be rotated or moved into position, respectively, can be dispensed with. Tools and the closing unit overall are lighter and can thus be used more dynamically in the course of tooling and production. The system can, in particular, also be converted or retooled in a comparatively simple manner, respectively. The system can also be built as a light weight construction because the injection device can and should be substantially lighter in order to be accommodated on the feed table. The transfer system according to the present invention is, therefore, particularly suitable for injection procedures in which no excessively high injection pressure is required, for example, in the injection-molding of end caps. In the present case, hot runners for the injection can also not be installed or moved, respectively, in an arbitrary manner because, according to the present invention, the feed tables, conjointly with the injection device thereon, carry out a linear movement.

A significant cost advantage arises above all on account thereof, because the basic investment for the machine can be lower on account of the deletion of an additional device for handling and of some parts of the injection station. If necessary, injection stations can also be retrofitted in that one of the feed tables is retooled or additionally installed.

The transfer system according to the present invention is imparted a modular construction by accommodating the injection device on a feed table. Different tools and the injection device are treated as separate modules and can be swapped in an alternating manner. Faster processing and shorter cycle times which consist of the machine time and the handling time of the profile are also possible, because the complexity for handling the profile is minimized without additional stations or handling systems being required to this end.

In one exemplary embodiment of the present invention the closing unit can comprise at least one, in particular two, closing installations which are pivotable about an axis, in particular, an axis perpendicular to the displacement direction of the first feed table. Some injection devices from the prior art are supported by massive presses during the injection so as to compress and seal the contour parts during the injection procedure. In the present case, at least one holding device for keeping the contour parts tight and/or closed during the injection can be used for this purpose in the present exemplary embodiment, the holding device being more in line with the lightweight construction mode. The injection device conjointly with the closing unit must thus be configured in a comparatively compact manner. With a view to the lightweight construction mode, each of the holding devices can have at least one pneumatic cylinder as a contact pressure device, for example, the contact pressure device being configured for exerting a contact pressure on one of the contour parts. However, an arbitrarily high injection pressure is typically also not selectable using the contact pressure device, which in turn represents a limiting factor. A primary application in the present case therefore lies in the injection-molding of end caps in which high pressures are not typically required. It is also to be taken into account that the hot runner of the injection device cannot be displaced in an arbitrary manner by virtue of the linear movement of the feed tables. The holding device, or the pneumatic cylinders, respectively, can be folded up conjointly with the closing installation. In principle, the use of other holding devices which use (electric) motors or hydraulic cylinders, for example, is also conceivable. A pneumatic cylinder is, however, typically expedient in order to implement a lightweight construction mode. The access to the mold, or to the contour parts, respectively, is facilitated by the possibility of being able to pivot the closing installations conjointly with the holding devices.

In one preferred refinement of the present invention, the contour parts are movable by way of a common drive device. Weight can also be saved on account thereof, and the installation space can become smaller since no separate drives are required for each of the contour parts. The common drive device can be disposed in a space saving manner such that the drive device conjointly with the remaining part of the injection device does not get in the way. This is all the more important because the closing installations are also to be pivotable conjointly with the holding devices. According to this refinement, this measure is achieved in that the drive device is disposed on that side of the first feed table that faces the transportation path.

In this context, a refinement can be achieved in that the drive device comprises at least one control ring which is connected in a rotationally fixed manner to at least one entrainment pin. A control ring is above all distinguished in that the control ring can likewise be integrated in a space-saving manner. If a common drive device is provided, the control ring by virtue of its construction mode is suitable as a central force-transmission element. A control ring can be configured so as to be hollow in the center, or to have a clearance in the center, respectively, such that the profile can be moved through the control ring in this region. The drive device thus forms part of the frame and can thus be disposed peripherally without being in the way of the profile or of the pivotal parts of the injection device. The control ring is connected in a rotationally fixed manner to an entrainment pin in order to be able to transmit onward a force or a torque, respectively. In one embodiment of the present invention, the control ring can in turn be driven or rotated, respectively, by a motor. This enables the control ring to be independently actuated. This movement can likewise be triggered by the linear displacement of the feed table, or be synchronized with the linear movement, respectively, to which end a corresponding control unit can be provided for controlling in an open loop or closed loop, respectively. For example, an electric motor which above all can be integrated in a cost-effective and space-saving manner and in terms of the weight thereof can also contribute toward a lightweight construction mode can advantageously be used, for example.

A slide can advantageously be used in order to be able to displace the contour parts. A slide of this type can, in particular, be configured so as to be wedge-shaped. The slide is mechanically coupled to one of the contour parts in that the slide and the contour part bear on one another, for example, wherein both the slide and the contour part are placed inside one another as wedges that are disposed in opposite directions. When the wedge-shaped slide is subsequently displaced, the contour part is mounted such that the latter does not move laterally in the direction in which the slide is displaced but is displaced perpendicularly to the direction so as to follow the wedge shape. A movement of the contour parts perpendicular to the plane of rotation of the control ring is enabled in this way. The slides thus form part of a gearbox for transmitting forces and for moving the contour parts, so to speak. This measure can thus be retained such that only one drive device which centrally drives the control ring is provided. A movement parallel to the rotation axis of the control ring can in turn be enabled by coupling the control ring and the slide. This increases the flexibility of the closing installation.

The control ring and the slide can in each case be coupled to one another mechanically by way of a control groove and an entrainment pin that engages in the control groove. This herein is in principle a particularly space-saving coupling because the corresponding parts can bear on one another and the control ring can be attached such that no outward installation space is required. Since the entrainment pin engages in the control groove, the former does not require any additional installation space. Moreover, the force is directly transmitted in this embodiment.

In principle, it is also conceivable for the entrainment pin to engage directly in a control groove in the contour part. In this case however, it is no longer possible for the contour part to move parallel to the rotation axis of the control ring, because a further mechanical transmission which in principle can be achieved by the slide is required to this end.

As has already been explained above, space can be saved with this control ring because the latter can correspondingly possess a clearance in the center that is utilized as follows. The first feed table herein can be displaced such that the profile placed in the processing position is introduced into the clearance. The introduction into the mold can then take place on that side that lies opposite the transportation path. The control ring forms the separation in relation to the side that faces the transportation path, so to speak. The feed table is thus displaced until the profile engages in the clearance. The motor for driving the control ring can also be assembled on this side that faces the transportation path, for example. Furthermore, the motor can be disposed laterally in relation to the control ring, or laterally in relation to the profile, respectively, so that the profile cannot collide with the motor. The remainder of the injection device and the pivoted closing installations with the pneumatic cylinders are then situated on that side that in terms of the control ring is opposite the transportation path.

During the movement of the feed table, thus the movement relative to the profile, the mold can be increasingly closed while the profile in relative terms moves through the clearance in the control ring (actually, the feed table is displaced and the profile is held in the processing position). However, the mold can also be closed only once the feed table has already been displaced in a linear manner toward the profile. In principle, the clamping action thus takes place by way of a kind of jaw chuck. T-nuts which can simply be inserted into the groove can be used as entrainment pins, for example.

Depending on the variant of embodiment of the present invention, different tools which are accommodated on different feed tables can be used in a transfer system in question. The feed tables can thus be disposed successively along the transportation path such that the profile travels through the transportation path. Depending on the processing procedure, the profile stops at the corresponding processing position until the processing procedure using the corresponding feed table has been completed. After the processing, the feed table can be returned and release the profile. At least one further feed table which has a cutting tool or a bending device, for example, can thus be provided. In a particularly preferred refinement of the present invention, aside from the injection device, a further tool such as, for example, a cutting tool or a bending device can also be accommodated on the same feed table such that two or more processing steps can be performed in an alternating manner using the same feed table as the processing station. A particularly compact construction mode can be implemented on account thereof.

BRIEF DESCRIPTION OF THE DRAWINGS

Exemplary embodiments of the present invention are illustrated in the drawings and will be explained in more detail hereunder by stating further details and advantages.

DETAILED DESCRIPTION OF THE INVENTION

Figure 1:
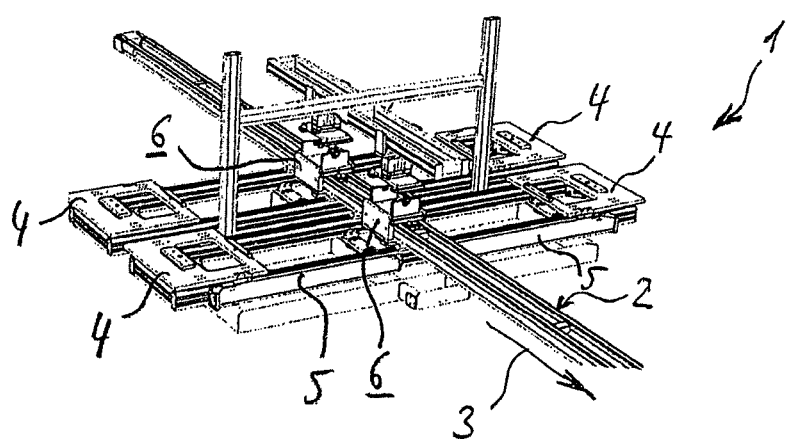
FIG. 1 shows a schematic illustration of the transfer system (with unpopulated feed tables)

FIG. 1 shows a schematic illustration of the transfer system 1 having the transportation device 2 for transporting the profile along the transportation path 3, the latter here being indicated by an arrow in FIG. 1. Feed tables 4 are disposed laterally of the transportation path 3 or the transportation device 2, respectively, the feed tables 4 in turn being able to be displaced in relation to the transportation path 3 or to the transportation device 2, respectively, thus perpendicularly to the transportation path 3, by way of the guides 5. The transportation device 2 in turn comprises clamping devices 6 for clamping the profiles during transportation. In order for both profile end portions to be processed, the feed tables are also disposed on both sides of the transportation path 3. Moreover, different feed tables 4 are provided in succession in terms of the transportation path 3.

Figure 2:
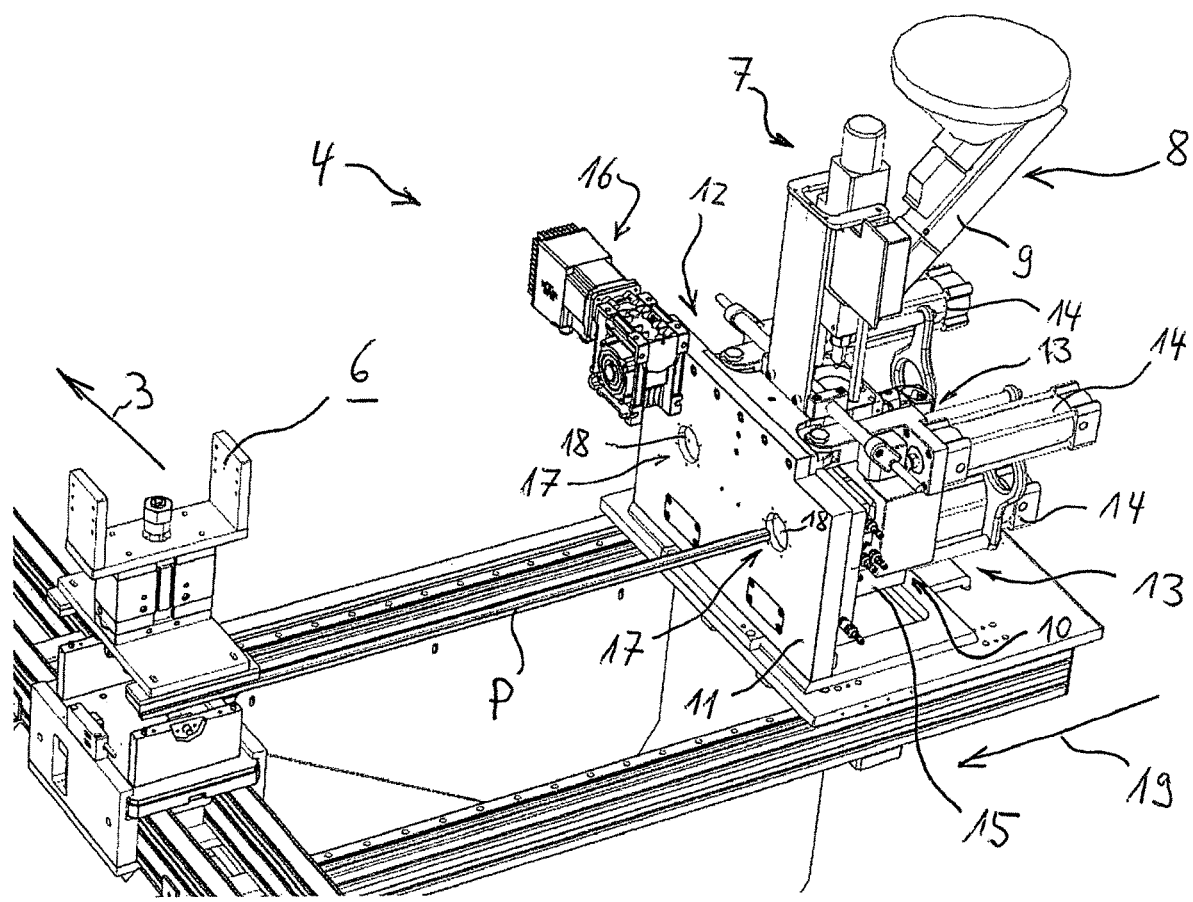
FIG. 2 shows an illustration of the injection device for a feed table.

For the purpose of visualization, the feed tables 4 in FIG. 1 are not equipped with a tool or an injection device, respectively. The injection device 7 in turn is separately illustrated in FIG. 2. This injection device 7 first comprises the actual injection-molding tool 8 which possesses a fixed injection apparatus 9 which is configured so as to be short in order to be accommodated on the feed table without being moved. The mold 10 into which the plastics material compound is in turn injected is in turn attached below the injection apparatus 9. An assembly wall separates the side on which the transportation path 3 is situated from the side on which the injection device 7 is in turn situated. The injection device 7 in turn comprises a closing unit 12 which comprises a total of two closing installations 13 which in each case have two holding devices 14, wherein the holding devices 14 are configured as pneumatic cylinders. The closing installations 13 furthermore comprise guides, for example, by way of which the pneumatic cylinders 14 are held and by way of which a contact pressure can be exerted on the contour parts 15 of the mold 10. In this way, the contour parts can also be held together during the injection molding.

The drive device 16 is partially mounted in the assembly plate 11 which firstly has the control ring 17. The control rings 17 are in each case provided with a clearance 18 through which the profile P can be introduced into the region of the mold 10. The displacement direction 19 of the feed table 4 is indicated by the arrow in FIG. 2; the feed table 4 is displaced in this displacement direction 19 until the feed table 4 receives the profile P in the clearance 18. The contour parts of the mold 10 are correspondingly moved by way of the control rings 17.

Figure 3:
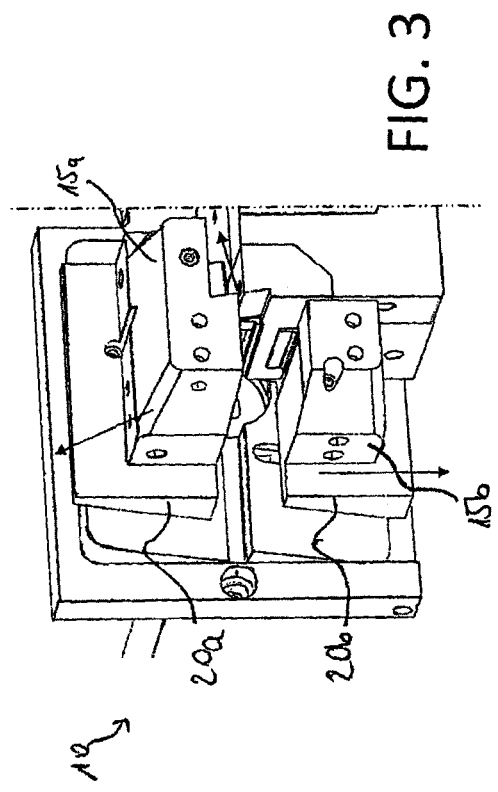
FIGS. 3 and 4 show an illustration of the closed or opened mold, respectively.
Figure 4:
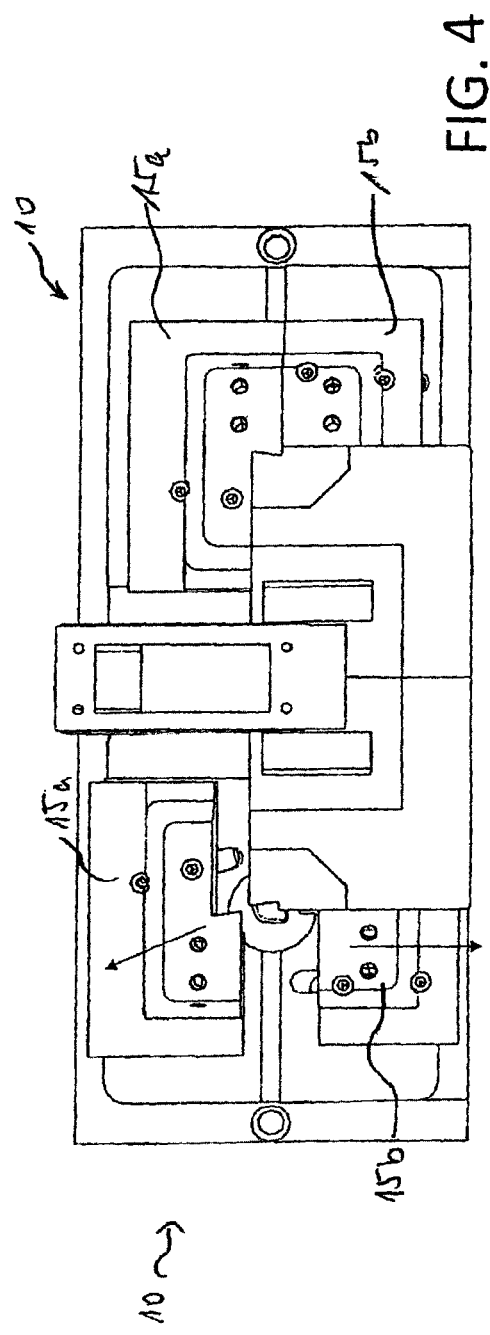

The opening of the mold is illustrated once again in detail in FIGS. 3 and 4. The mold here comprises the contour parts 15a, 15b which are illustrated in the opened state in FIG. 3. The contour parts 15a, 15b bear on the wedge-shaped slides 20a, 20b. The contour parts 15a, 15b are mounted such that, in a movement of the slides 20a, 20b, the contour parts 15a, 15b by way of the wedge are displaced perpendicularly to the movement of the slides 20a, 20b.

FIG. 4 shows the difference between a closed and an opened mold 10.

Figure 5:
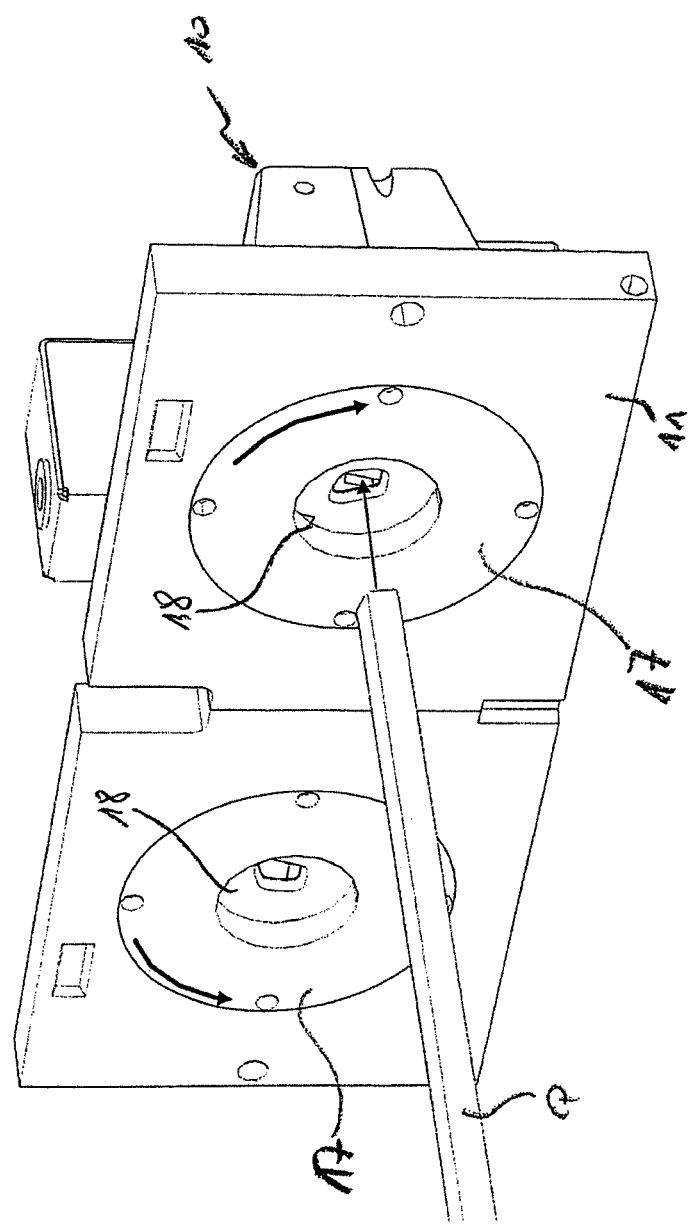
FIG. 5 shows an illustration of the drive device having control rings.

The control rings 17 as part of the drive device 16 are once again illustrated in FIG. 5, and the profile P is pushed through the clearance 18 and thus makes its way into the mold 10, the contour parts 15a, 15b of the latter still being opened at this point in time.

Figure 6:
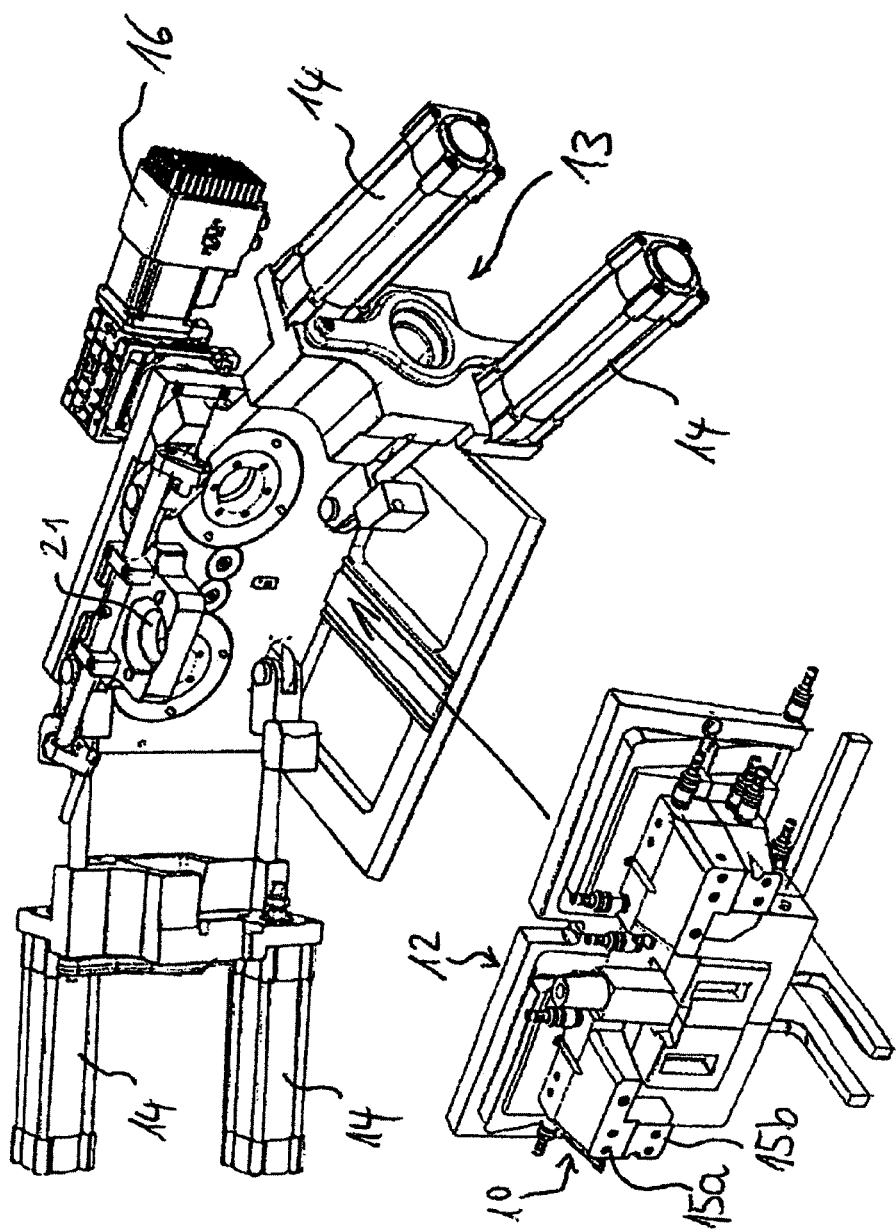
FIG. 6 shows the closing installations having pivoted holding devices in the form of pneumatic cylinders.

The laterally pivoted closing installations 13 are once again separately illustrated in FIG. 6, on account of which access to the location which is provided for attaching the closing unit 12 with the contour parts 15a, 15b is achieved. Pneumatic cylinders 14 which are distributed among two closing installations 13 are provided for contact pressure. A higher contact pressure can be achieved by the number and distribution of the pneumatic cylinders; it is also possible for the pressure to be more uniformly distributed such that the overall injection pressure can also be increased because the molds 10 are held together in a more stable manner. The plastics material compound is guided to the molds by way of the clearance 21. As is illustrated in FIG. 6, the mold 10 is attached in the region illustrated with dashed lines.

It is a common feature of all embodiments and refinements of the invention that the injection device comprises a mold for receiving and mounting the profile during the injection molding and for configuring the cavity required during the injection, wherein the mold has at least two contour parts for enclosing the profile in the part to be injection-molded during the injection and for configuring the cavity. The injection device herein has a closing unit for opening and closing the contour parts. The closing unit when moving the first feed table relative to the profile is configured for keeping the contour parts open until the profile is enclosed by the contour parts, wherein the transportation device is configured for moving, and preferably not rotating, the profile above all in the region of the processing position exclusively parallel to the transportation path. The closing unit and the injection device are assembled so as to be displaceable conjointly with the first feed table. The first feed table in the direction of the transportation path or of the profile, respectively, is displaceable until the contour parts in the closed state can enclose the profile in the part to be injection-molded. This measure not only enables a light weight construction mode but also enables a particular degree of flexibility when retooling the machine and numerous cost advantages as a result of the lower requirement in terms of material and space as well as the time advantage during handling. One operator can optionally also be dispensed with. A transfer system according to the present invention having a feed table of this type with an injection device is particularly suitable for being able to carry out injection procedures at pressures that are not excessively high, for example, injection procedures for end caps.

LIST OF REFERENCE SIGNS

1 Transfer system
2 Transportation device
3 Transportation path
4 Feed table
5 Guide
6 Clamping device
7 Injection device
8 Injection-molding tool
9 Hot runner/Injection apparatus
10 Mold
12 Closing unit
13 Closing installation
14 Holding device/Pneumatic cylinder
15, 15a, 15b: Contour parts
16 Drive device
17 Control ring
18 Clearance
19 Displacement path/direction of the feed table
20a, 20b Slide
21 Clearance
P Profile

The invention claimed is:

1. A transfer system for transporting and for processing profiles, comprising a transportation device for transporting the profile on a transportation path, a first feed table which is displaceable relative to the transportation path and/or to the profile being displaced on the transportation path, and an injection device for producing an injection-molded end, of a further profile portion, of a positioning pin, and/or for connecting the profile to a further profile portion, wherein the transportation device is configured for positioning the profile on the transportation path in a processing position for processing the profile by the injection device, wherein the injection device comprises a mold for receiving and mounting the profile during the injection and for configuring the cavity to be filled during the injection, wherein the mold has at least two contour parts for enclosing the profile in the part to be injection-molded during the injection and for configuring the cavity, and wherein the injection device has a closing unit for opening and closing the contour parts, wherein the closing unit, when moving the first feed table relative to the profile, is configured for keeping the contour parts open until the profile is enclosed by the contour parts, and wherein the transportation device is configured for moving the profile, in the region of the processing position, exclusively parallel to the transportation path, wherein the closing unit and the injection device are assembled so as to be displaceable conjointly with the first feed table, and the first feed table in the direction of the transportation path and/or of the profile is displaceable until the contour parts in the closed state can enclose the profile in the part to be injection-molded, wherein the contour parts are movable by way of a common drive device which is disposed on that side of the first feed table that faces the transportation path, wherein the drive device comprises at least one control ring which is connected in a rotationally fixed manner to at least one entertainment pin, and wherein the processing profiles are door seal profiles for motor vehicles.

2. The transfer system according to claim 1, wherein the closing unit comprises at least one closing installation which is pivotable about an axis, wherein the closing installation has at least one holding device for keeping the contour parts tight and/or closed during the injection.

3. The transfer system according to claim 2, wherein the at least one holding device has at least one pneumatic cylinder as a contact pressure device, said pneumatic cylinder being configured for exerting a contact pressure on one of the contour parts.

4. The transfer system according to claim 1, wherein the drive device comprises a motor for driving and/or rotating the control ring.

5. The transfer system according to claim 2, wherein the at least one closing installation for displacing at least one of the contour parts comprises at least one slide which is coupled to at least one of the contour parts.

6. The transfer system according to claim 5, wherein the at least one control ring and the at least one slide are in each case coupled to one another by way of a control groove and an entrainment pin that engages in the control groove.

7. The transfer system according to claim 5, wherein the at least one control ring in the center has a clearance, wherein the first feed table is displaceable such that the profile positioned in the processing position is introduced into the clearance and on that side that lies opposite the transportation path is able to be received in the mold.

8. The transfer system according to claim 1, further comprising at least one second feed table, which comprises a cutting tool for trimming the profile and/or a bending device and which is displaceable relative to the transportation path and/or to the profile being displaced on the transportation path, provided along the transportation path.

9. The transfer system according to claim 1, wherein the first feed table aside from the injection device also comprises at least one further tool so as to enable a further processing step in the processing position of the profile provided during the injection.

10. The transfer system according to claim 1, wherein the first feed table is displaceable perpendicularly to the transportation path and/or to the profile being displaced on the transportation path.

11. The transfer system according to claim 2, wherein the closing unit comprises two closing installations.

12. The transfer system according to claim 2, wherein the at least one closing installation is pivotable about an axis perpendicular to the displacement direction of the first feed table.

13. The transfer system according to claim 5, wherein the at least one slide is a wedge-shaped slide.

14. The transfer system according to claim 8, wherein the second feed table is displaceable perpendicularly to the transportation path and/or to the profile being displaced on the transportation path.

15. The transfer system according to claim 9, wherein the at least one further tool is a cutting tool for trimming the profile and/or a bending device.

* * * * *